United States Patent
Hatano et al.

(10) Patent No.: US 12,048,356 B2
(45) Date of Patent: Jul. 30, 2024

(54) DATA GENERATING APPARATUS, SHOE MANUFACTURING SYSTEM AND DATA GENERATING METHOD

(71) Applicant: ASICS CORPORATION, Kobe (JP)

(72) Inventors: Genki Hatano, Kobe (JP); Shingo Takashima, Kobe (JP); Yuya Kozuka, Kobe (JP); Satoru Abe, Kobe (JP); Kenta Takahama, Kobe (JP)

(73) Assignee: ASICS CORPORATION, Kobe (JP)

( * ) Notice: Subject to any disclaimer, the term of this patent is extended or adjusted under 35 U.S.C. 154(b) by 260 days.

(21) Appl. No.: 17/453,486

(22) Filed: Nov. 3, 2021

(65) Prior Publication Data

US 2022/0225738 A1  Jul. 21, 2022

(30) Foreign Application Priority Data

Sep. 4, 2020 (JP) .................. 2020-148649

(51) Int. Cl.
*A43D 1/02* (2006.01)
*A43B 1/04* (2022.01)
(Continued)

(52) U.S. Cl.
CPC .............. *A43D 1/025* (2013.01); *A43B 1/04* (2013.01); *A43D 3/02* (2013.01); *B29C 64/393* (2017.08);
(Continued)

(58) Field of Classification Search
CPC ...... A43D 1/025; A43D 3/02; A43D 2200/60; A43D 999/00; A43B 1/04; A43B 1/028; A43B 1/05; A43B 23/0235; A43B 23/0255; B29C 64/393; B33Y 10/00; B33Y 50/02; B33Y 80/00
See application file for complete search history.

(56) References Cited

U.S. PATENT DOCUMENTS 2,440,393 A    4/1948  Clark
6,255,235 B1   7/2001  Hiraoka et al.
(Continued)

FOREIGN PATENT DOCUMENTS

DE       103 12 129 A1    9/2004
DE    20 2016 106048 U1   11/2016
(Continued)

OTHER PUBLICATIONS

Communication pursuant to Article 94(3) EPC issued by the European Patent Office on Feb. 24, 2023, which corresponds to European Patent Application No. 21197516.4-1015 and is related to U.S. Appl. No. 17/453,486.
(Continued)

*Primary Examiner* — Ziaul Karim
(74) *Attorney, Agent, or Firm* — Studebaker & Brackett PC

(57) ABSTRACT

A data generating apparatus includes: an input unit that receives foot shape data; a processor that computes shoe last data from the foot shape data received by the input unit; and an output unit that outputs the shoe last data computed by the processor. The processor further computes processing data for processing a member that forms an upper of a shoe, based on the computed shoe last data. The output unit further outputs the processing data computed by the processor.

8 Claims, 9 Drawing Sheets

(51) Int. Cl.
    *A43D 3/02*     (2006.01)
    *B29C 64/393*     (2017.01)
    *B33Y 10/00*     (2015.01)
    *B33Y 50/02*     (2015.01)
    *B33Y 80/00*     (2015.01)

(52) U.S. Cl.
    CPC ............... *B33Y 10/00* (2014.12); *B33Y 50/02* (2014.12); *B33Y 80/00* (2014.12); *A43D 2200/60* (2013.01)

(56) References Cited

U.S. PATENT DOCUMENTS

| | | | |
|---|---|---|---|
| 2006/0143839 A1 | 7/2006 | Fromme | |
| 2015/0032242 A1* | 1/2015 | Schouwenburg | G05B 15/02 700/98 |
| 2015/0366293 A1* | 12/2015 | Clarkson | G06F 30/20 703/1 |
| 2016/0085907 A1* | 3/2016 | Schouwenburg | B29C 64/393 700/98 |
| 2016/0166011 A1 | 6/2016 | Bruce et al. | |
| 2017/0066212 A1* | 3/2017 | de Backer | A43D 3/02 |
| 2020/0097635 A1* | 3/2020 | Schouwenburg | B33Y 50/00 |

FOREIGN PATENT DOCUMENTS

| | | |
|---|---|---|
| EP | 3 827 690 A1 | 6/2021 |
| JP | 2000-152803 A | 6/2000 |
| JP | 2006-521836 A | 9/2006 |
| JP | 2007-267996 A | 10/2007 |
| JP | 2017-527004 A | 9/2017 |
| JP | 6685303 B2 | 4/2020 |
| WO | 2006/063496 A1 | 6/2006 |
| WO | 2020/239904 A1 | 12/2020 |
| WO | 2021/064782 A1 | 4/2021 |

OTHER PUBLICATIONS

International Search Report issued in PCT/JP2021/034430; mailed Dec. 7, 2021.

The extended European search report issued by the European Patent Office on May 23, 2022, which corresponds to European Patent Application No. 21197516.4-1015 and is related to U.S. Appl. No. 17/453,486.

An Office Action; "Notice of Reasons for Refusal," mailed by the Japanese Patent Office on May 28, 2024, which corresponds to Japanese Patent Application No. 2020-148649 and is related to U.S. Appl. No. 17/453,486; with English language translation.

* cited by examiner

FIG.8

| MEMBER THAT FORMS UPPER | SHAPE | MATERIAL | OTHERS |
|---|---|---|---|
| A (FORM UPPER FROM ONE SHEET) | SHEET (THREE LAYERS) | HAVING LAYER CONTAINING HEAT-SHRINKABLE THREADS | HEAT SHRINKAGE COEFFICIENT |
| B (FORM UPPER FROM THREE SHEETS) | SHEET B1 | CLOTH | — |
| | SHEET B2 | RESIN | — |
| | SHEET B3 | CONTAINING HEAT-SHRINKABLE THREADS | HEAT SHRINKAGE COEFFICIENT |
| C | PROCESSED USING 3D PRINTER | THERMOPLASTIC RESIN | SETTING CONDITION OF 3D PRINTER |
| ... | ... | ... | ... |

DATA GENERATING APPARATUS, SHOE MANUFACTURING SYSTEM AND DATA GENERATING METHOD

BACKGROUND OF THE INVENTION

Field of the Invention

The present disclosure relates to a data generating apparatus, a shoe manufacturing system and a data generating method.

Description of the Background Art

When a custom-made shoe tailored to a foot of a user is manufactured, a foot shape is measured using a measuring apparatus, and shoe last data is generated based on the obtained foot shape data. Based on the generated shoe last data, a shoe last for manufacturing the shoe is produced (e.g., Japanese Patent No. 6685303). Furthermore, according to Japanese Patent No. 6685303, the produced shoe last is inserted through a braiding apparatus to thereby produce a braided upper.

SUMMARY OF THE INVENTION

Since the shoe last is inserted through the braiding apparatus to thereby produce the upper fitted to the shoe last by braiding, a dedicated shoe that reflects a foot shape of each individual can be manufactured. However, since insertion of the shoe last through the braiding apparatus is required, the shoe last needs to be produced from a material that can withstand the braiding apparatus, and thus, a material of the shoe last and a method for producing the shoe last are limited. In addition, since the upper cannot be produced until the shoe last is produced, the time required to manufacture the shoe is long.

An object of the present disclosure is to provide a data generating apparatus, a shoe manufacturing system and a data generating method in which a material of a shoe last and a method for producing a shoe last are not limited and the time required to manufacture a shoe can be shortened.

A data generating apparatus according to an aspect of the present disclosure generates shoe last data for manufacturing a shoe from measured foot shape data. The data generating apparatus includes: an input unit that receives the foot shape data; a computing unit that computes the shoe last data from the foot shape data received by the input unit; and an output unit that outputs the shoe last data computed by the computing unit. The computing unit further computes processing data for processing a member that forms an upper of the shoe, based on the computed shoe last data, and the output unit further outputs the processing data computed by the computing unit.

A shoe manufacturing system according to an aspect of the present disclosure includes: a measuring apparatus that measures foot shape data; the above-described data generating apparatus; a shoe last producing apparatus that produces a shoe last based on the shoe last data generated by the data generating apparatus; and a processing apparatus that processes a member that forms an upper, based on processing data generated by the data generating apparatus.

A data generating method according to an aspect of the present disclosure generates shoe last data for manufacturing a shoe from measured foot shape data. The data generating method includes: receiving the foot shape data; computing the shoe last data from the received foot shape data; computing processing data for processing a member that forms an upper of the shoe, based on the computed shoe last data; and outputting the computed shoe last data and the computed processing data.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 illustrates an example of a database that stores information about a member that forms an upper.

DESCRIPTION OF THE PREFERRED EMBODIMENTS

Figure 1:
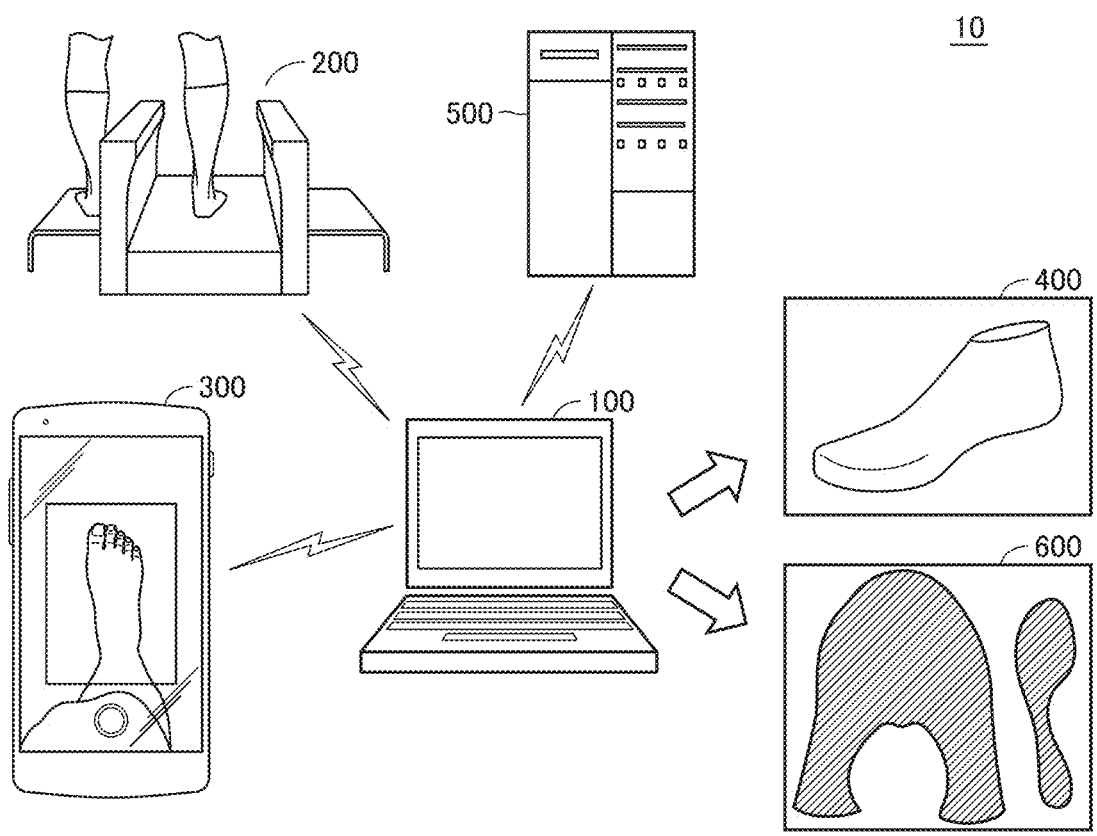
FIG. 1 is a schematic view showing a configuration example of a shoe manufacturing system according to a first embodiment.

Embodiments will be described hereinafter with reference to the drawings. In the following description, the same components are denoted by the same reference characters. Their names and functions are also the same. Therefore, a detailed description about them will not be repeated.

First Embodiment

In a first embodiment, an example of application of the present disclosure will be described. First, in the first embodiment, a shoe manufacturing system that manufactures a custom-made shoe tailored to a foot of a user at, for example, a store will be described. A portion of the shoe manufacturing system that generates shoe last data based on foot shape data measured by a measuring apparatus, and further, generates processing data for processing a member that forms an upper of a shoe, thereby producing a shoe last and an upper will be particularly described below.

FIG. 1 is a schematic view showing a configuration example of a shoe manufacturing system 10 according to the first embodiment. Referring to FIG. 1, the shoe manufacturing system 10 includes a data generating apparatus 100, a measuring apparatus 200 that measures a foot shape, a shoe last producing apparatus 400 that produces a shoe last based on shoe last data, and a processing apparatus 600 that processes a member that forms an upper, based on processing data. Depending on stores, or at a remote location such as a user's house, the foot shape may be measured using a mobile terminal 300 such as a smartphone, instead of the measuring apparatus 200. The data generating apparatus 100 can communicate with a data server 500 placed inside or outside a store.

Figure 2:
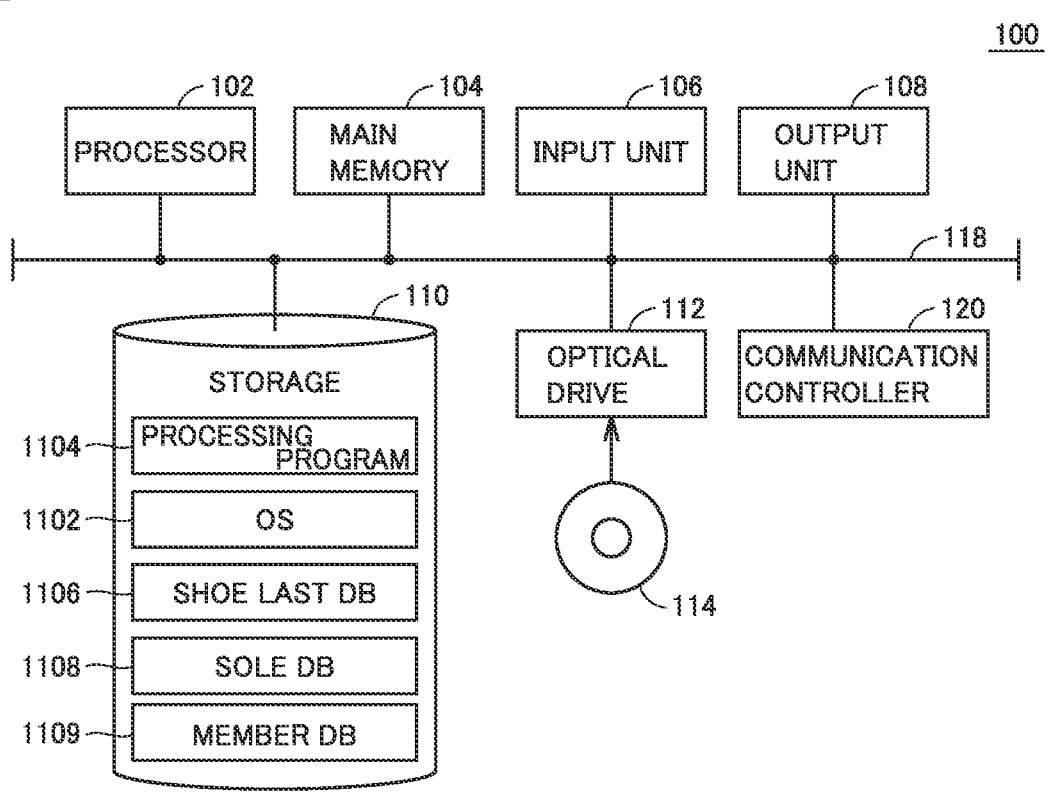
FIG. 2 is a schematic view showing a hardware configuration example of a data generating apparatus according to the first embodiment.

The data generating apparatus 100 generates shoe last data based on foot shape data obtained from the measuring apparatus 200 or the mobile terminal 300, and further generates processing data for processing a member that forms an upper of a shoe, based on the shoe last data. FIG. 2 is a schematic view showing a hardware configuration example of the data generating apparatus 100 according to the first embodiment. Referring to FIG. 2, the data generating apparatus 100 includes a processor 102, a main memory 104, an input unit 106, an output unit 108, a storage 110, an optical drive 112, and a communication controller 120. These components are connected through a processor bus 118.

The processor 102 is implemented by a CPU, a GPU or the like, and can read programs (by way of example, an OS 1102 and a processing program 1104) stored in the storage 110 and deploy the programs in the main memory 104 for execution. The processor 102 executes the processing program 1104 that computes the shoe last data from the foot shape data (including additional information, if any) received by the input unit 106, based on a prescribed algorithm. Furthermore, the processor 102 executes the processing program 1104 that further computes the processing data for processing the member that forms the upper of the shoe, based on the computed shoe last data. The processor 102 that executes the processing program 1104 corresponds to a computing unit of the data generating apparatus 100.

The main memory 104 is implemented by, for example, a volatile storage device such as a DRAM or an SRAM. The storage 110 is implemented by, for example, a non-volatile storage device such as an HDD or an SSD.

In addition to the OS 1102 for implementing a basic function, the processing program 1104 for providing a function as the data generating apparatus 100 is stored in the storage 110. That is, the processing program 1104 is executed by the processor 102 of the data generating apparatus 100, to thereby compute the shoe last data from the foot shape data and further compute the processing data. Furthermore, a shoe last database 1106 including a plurality of pieces of shoe last data, a sole database 1108 including a plurality of pieces of sole data corresponding to a sole-side region of a shoe, and a member database 1109 including information about the member that forms the upper are stored in the storage 110. Only a plurality of pieces of upper data corresponding to an upper-side region of a shoe may be stored in the shoe last database 1106 as the shoe last data. Only the frequently-used data in the shoe last database 1106, the sole database 1108 and the member database 1109 may be stored in the storage 110, and the other data may be stored in the data server 500. Alternatively, only lists may be stored in the shoe last database 1106, the sole database 1108 and the member database 1109, and the plurality of pieces of shoe last data, the plurality of pieces of sole data, and the information about the member that forms the upper themselves may be stored in the data server 500.

The input unit 106 includes an input interface connected to the measuring apparatus 200 or the mobile terminal 300 to receive the foot shape data from the measuring apparatus 200 or the mobile terminal 300. The input unit 106 is implemented by a keyboard, a mouse, a microphone, a touch device or the like, and can further receive the additional information selected by the user. The additional information refers to information other than information about a foot size and a foot shape. The additional information can be divided into information about a shape of a shoe, information about the use of a shoe, and information about a foot of a user, based on its contents. The information about the shape of the shoe includes information about user's preference, information about a shoe used by a user, existing shoe last data, information about a shape of a wearing opening, information about a material of an upper, information about a shape of a sole, and the like. The information about the use of the shoe includes running data, information about a sport in which a shoe is used, and the like. The information about the foot of the user includes information about a pressure of an instep portion, information about a plantar pressure, information about deformation of a foot shape, and the like.

The additional information can also be divided into factual information and selective information, based on its contents. The factual information refers to objective information, and refers to information that can be represented by numerical data, such as length, pressure and speed. The selective information refers to subjective information for the user, and refers to information selected based on, for example, an interview with the user, such as a little loose, a little tight, fast, and slow.

An example of the information about user's preference is information about user's taste that "a little loose" is the user's taste about a shape of a toe area, "a little tight" is the user's taste about a shape of a midfoot portion area, and "average" is the user's taste about a shape of a heel area. The information about user's taste is selective information that can be collected by an interview with the user, and can be obtained by causing the user to input the user's taste for each area of the shoe into the mobile terminal 300. The processor 102 may compute the shoe last data that reflects the above-described additional information in addition to the foot shape data about the foot size and the foot shape.

The output unit 108 includes an output interface that outputs the shoe last data computed by the processor 102 to the shoe last producing apparatus 400 and outputs the processing data to the processing apparatus 600. The output unit 108 is implemented by a display, various indicators, a printer or the like, and outputs a processing result or the like from the processor 102.

The communication controller 120 exchanges data with another control device or the like by using wired or wireless communication. The data generating apparatus 100 may exchange the foot shape data and the additional information with the measuring apparatus 200 or the mobile terminal 300 through the communication controller 120, may exchange the shoe last data with the shoe last producing apparatus 400 through the communication controller 120, and may exchange the processing data with the processing apparatus 600 through the communication controller 120. In addition to the communication controller 120, a USB controller connected to the processor bus 118 may be provided to exchange the data with another control device or the like through USB connection.

The data generating apparatus 100 includes the optical drive 112 that may read a computer-readable program stored in a recording medium 114 (e.g., optical recording medium such as a digital versatile disc (DVD)) in a non-transitory manner, and install the program in the storage 110 or the like.

Although the processing program 1104 and the like executed in the data generating apparatus 100 may be installed through computer-readable recording medium 114, the processing program 1104 and the like may be installed by being downloaded from a server device or the like on a network. In addition, the functions provided by the data generating apparatus 100 according to the first embodiment may be implemented by using a part of a module provided by the OS.

Although FIG. 2 shows the configuration example in which the processor 102 executes the programs to thereby provide the functions required as the data generating apparatus 100, a part or all of these provided functions may be implemented by using a dedicated hardware circuit (such as, for example, an ASIC or an FPGA). The configuration of the data generating apparatus 100 shown in FIG. 2 is illustrative and the present disclosure is not limited to this configuration.

The measuring apparatus 200 is implemented by a three-dimensional foot shape scanner using laser measurement. A laser measurement apparatus that is built into walls provided on both sides of a foot put on a top board measures the foot while moving from a toe to a heel of the foot, thereby obtaining three-dimensional foot shape data of the user. A measurement method or the like of the measuring apparatus 200 is not particularly limited, as long as it can measure the three-dimensional foot shape data. The mobile terminal 300 such as a smartphone may also be used to capture an image of the foot of the user and obtain image data of the foot, and the foot shape data may be generated from the obtained image data of the foot through preliminarily installed software.

Figure 3A:
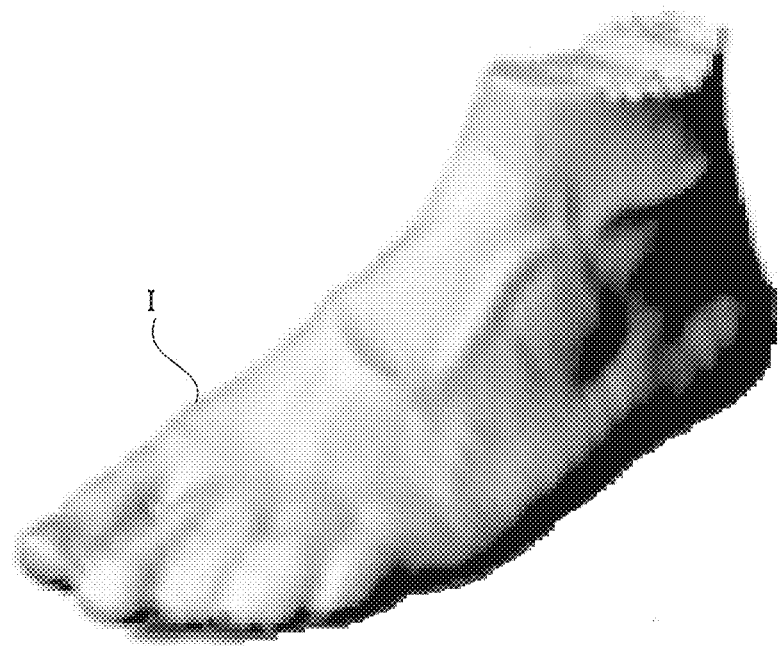
FIG. 3A is a schematic view of foot shape data.
Figure 3B:
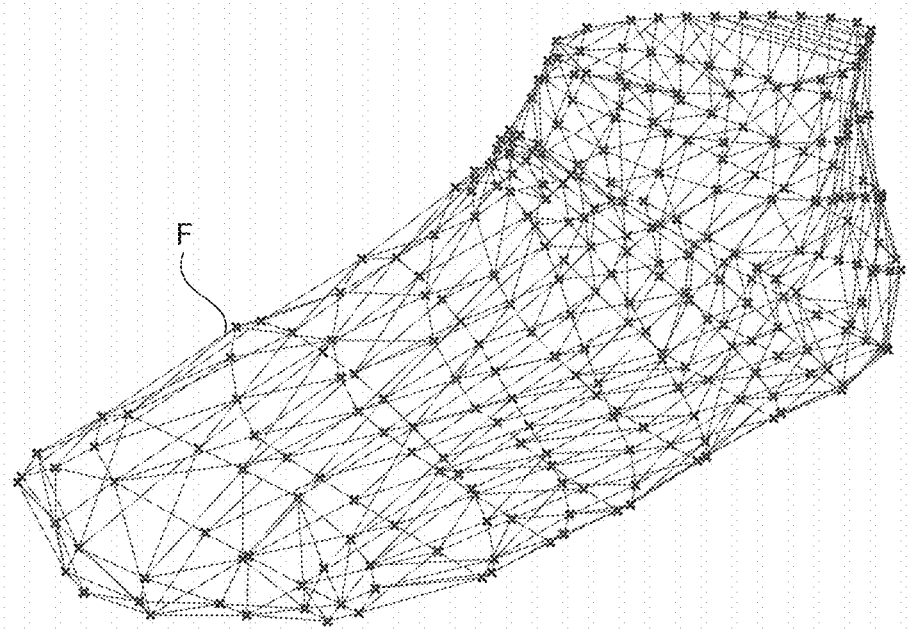
FIG. 3B is a schematic view of the foot shape data.

FIGS. 3A and 3B are schematic views of foot shape data. FIG. 3A is a perspective view of three-dimensional foot shape data I obtained by measurement using the measuring apparatus 200 or the mobile terminal 300. An amount of foot shape data I shown in FIG. 3A is large, although it depends on a resolution. Therefore, the measuring apparatus 200 or the mobile terminal 300 does not transmit three-dimensional foot shape data I as it is to the data generating apparatus 100, but converts three-dimensional foot shape data I into foot shape data F based on a homologous model shown in FIG. 3B and transmits foot shape data F to the data generating apparatus 100. Foot shape data F based on the homologous model herein refers to foot shape data that represents a foot shape by a polyhedron having an identical-phase geometric structure, using anatomically associated two hundred and ninety-five data points. The foot shape data is not limited to foot shape data F based on the homologous model, and may be foot shape data based on a model created by dividing a foot shape into a plurality of prescribed cross sections and connecting a plurality of representative points specified within the cross sections, as long as it can represent an object shape of foot shape data I shown in FIG. 3A.

Although the description has been given of the example in which the measuring apparatus 200 or the mobile terminal 300 converts three-dimensional foot shape data I into foot shape data F based on the homologous model, the data generating apparatus 100 may convert three-dimensional foot shape data I into foot shape data F based on the homologous model. Alternatively, the mobile terminal 300 may only capture the image of the foot of the user and obtain the image data of the foot without generating the foot shape data, and the data generating apparatus 100 may generate the foot shape data based on the image data of the foot obtained by the mobile terminal 300.

The shoe last producing apparatus 400 is implemented by a 3D printer, a computerized numerical control (CNC) machine tool or the like that produces a shoe last based on shoe last data. When the shoe last producing apparatus 400 is implemented by a 3D printer, a three-dimensional shoe last made of resin is produced based on the shoe last data generated by the data generating apparatus 100. The material of the produced shoe last is not limited to resin, and may be cardboard or the like. When the shoe last is made of cardboard, the shoe last producing apparatus 400 may be an apparatus that cuts the cardboard, or an apparatus that outputs a cardboard cutting shape pattern. When the shoe last is variable in shape, the shoe last producing apparatus 400 is an apparatus that varies the shoe last based on the shoe last data generated by the data generating apparatus 100.

The processing apparatus 600 is implemented by a cutting apparatus or the like that cuts a member that forms an upper, based on processing data. When the member that forms the upper includes a sheet-shaped member such as cloth, the processing data is cutting data for cutting the member that forms the upper from the sheet-shaped member. The member that forms the upper is not limited to a sheet such as cloth, and any member may be used as long as it can form the upper. For example, when a part of the upper is made of resin, the member that forms the upper may be produced using the 3D printer.

When the processing apparatus 600 is implemented by the cutting apparatus, the data generating apparatus 100 generates the cutting data as the processing data adapted to the cutting apparatus. When the processing apparatus 600 is implemented by the 3D printer, the data generating apparatus 100 generates 3D data as the processing data adapted to the 3D printer. Since the processing apparatus 600 can process the member that forms the upper, based on the processing data, without using the shoe last, a material of the shoe last produced by the shoe last producing apparatus 400 and a method for producing the shoe last are not limited. In addition, since the processing apparatus 600 processes the member that forms the upper, based on only the processing data, it is unnecessary to wait until the shoe last producing apparatus 400 produces the shoe last, and then, process the member that forms the upper. Therefore, these operations can be performed in parallel, and thus, the time required to manufacture the shoe can be shortened.

An example of shortening of the time required to manufacture the shoe will be described. First, manufacturing of the shoe needs to mainly go through the following manufacturing steps (a) to (g):

(a) generating shoe last data (3D data) of a shoe last;
(b) generating processing data (cutting data) of an upper from the shoe last data;
(c) when the shoe last is produced from, for example, cardboard, generating cutting data of the cardboard from the shoe last data, and cutting the cardboard using a laser cutter based on the cutting data;
(d) cutting a member that forms an upper, using the laser cutter, based on the processing data;
(e) assembling the cut cardboard and producing the shoe last;
(f) sewing the cut member (e.g., cloth) into a shape of the upper; and
(g) putting the sewn upper over the assembled shoe last and performing steam heating to heat-shrink the upper.

In the above-described manufacturing steps, the processing data of the upper is generated in the step (b) without waiting for the step (e) of producing the shoe last, and thus, the steps (c) and (d) can be performed in parallel. Since it is unnecessary to wait for the step (c) of cutting the cardboard and the step (d) of cutting the member that forms the upper, the step (e) and the subsequent steps can be started earlier.

Figure 4:
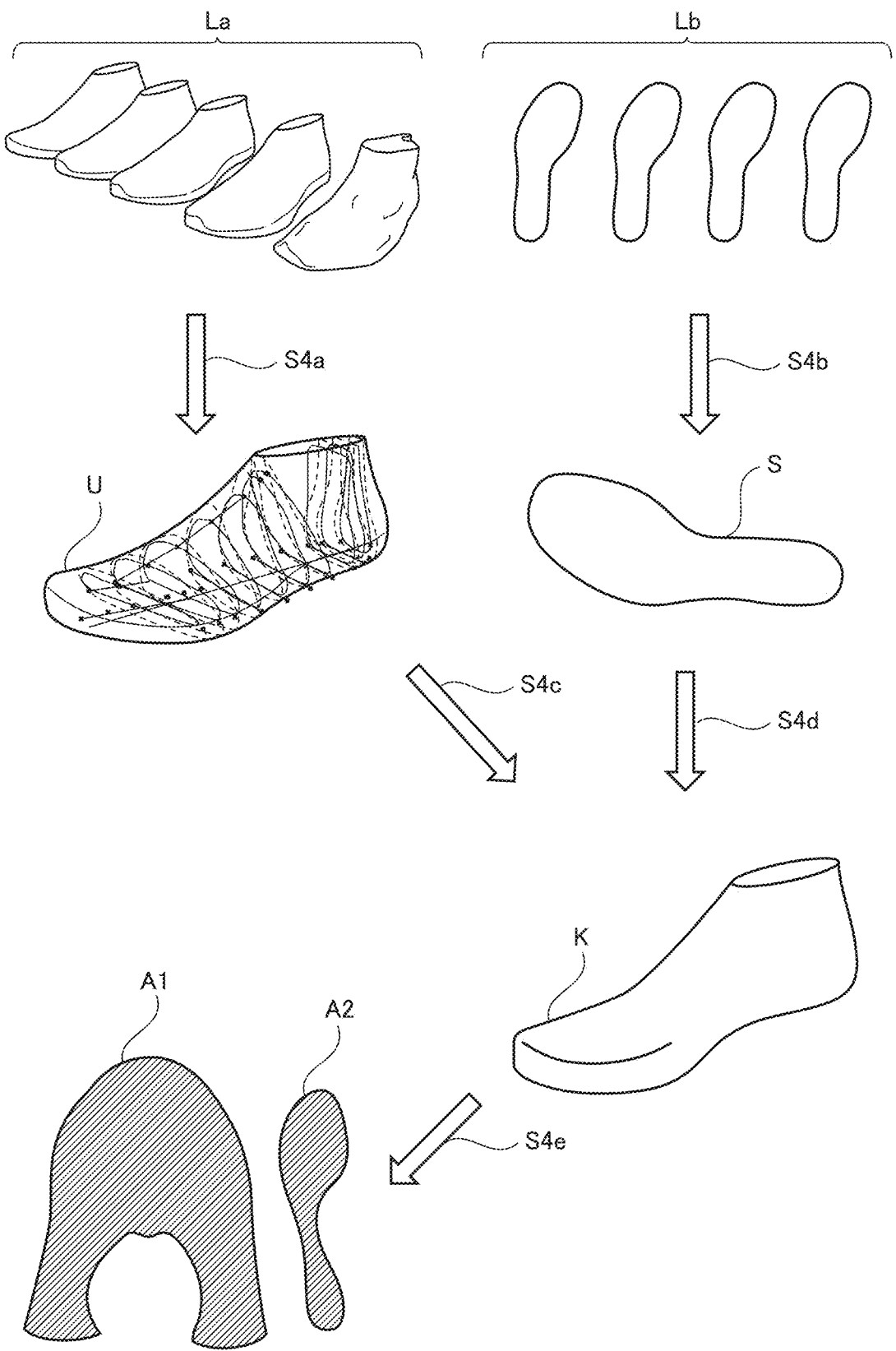
FIG. 4 is a schematic view for illustrating how the data generating apparatus according to the first embodiment computes shoe last data and processing data.

FIG. 4 is a schematic view for illustrating how the data generating apparatus 100 according to the first embodiment computes the shoe last data and the processing data. First, the data generating apparatus 100 selects shoe last data U close to the foot shape data from a library La of a plurality of pieces of shoe last data stored in the shoe last database 1106 (step S4a). In addition, the data generating apparatus 100 selects sole data predetermined by the shoe to be manufactured or sole data selected by the user from a library Lb of a plurality of pieces of sole data stored in the sole database 1108 (step S4b).

FIG. 4 shows the example of separately selecting and combining shoe last data U and sole data S. However, the data generating apparatus 100 may select only the shoe last data close to the foot shape data from the library that stores the plurality of pieces of shoe last data, corrects upper data corresponding to an upper-side region, of the selected shoe last data, so as to match the foot shape data, and use sole data corresponding to a sole-side region as it is. As a matter of course, the data generating apparatus 100 may correct the upper data corresponding to the upper-side region, of the selected shoe last data, so as to match the foot shape data, and correct the sole data corresponding to the sole-side region so as to match the sole data selected by the user. Instead of selecting the data from the library stored in the database and correcting the data, the data generating apparatus 100 may compute and generate the shoe last data from the foot shape data based on a prescribed algorithm.

The data generating apparatus 100 corrects a portion (e.g., a surface portion of an instep portion) of selected shoe last data U that is different from the foot shape data, and when there is an input of the additional information, the data generating apparatus 100 generates shoe last data U including specified portions corrected so as to reflect the additional information (step S4c). Specifically, the data generating apparatus 100 increases a cross-sectional shape of the shoe last data about the toe area by, for example, 3%, based on the information about user's taste (additional information) that "a little loose" is the user's taste about the shape of the toe area, and decreases a cross-sectional shape of the shoe last data about the heel area by, for example, 2%, based on the information about user's taste (additional information) that "a little tight" is the user's taste about the shape of the heel area.

In addition, the data generating apparatus 100 makes a correction such that selected sole data S matches selected shoe last data U (step S4d). The data generating apparatus 100 combines corrected shoe last data U and corrected sole data S to generate shoe last data K. Shoe last data K corresponds to the final shoe last data computed and generated from the foot shape data.

Furthermore, the data generating apparatus 100 computes processing data for processing the member that forms the upper of the shoe, based on generated shoe last data K (step S4e). The data generating apparatus 100 may compute the processing data based on only the upper data corresponding to the upper-side region, of the shoe last data, not the shoe last data. When the member that forms the upper includes a sheet-shaped member, the processing data is cutting data for cutting shapes A1 and A2 of the upper from the sheet-shaped member as shown in FIG. 4. Shape A1 of the upper corresponds to a side surface portion of the upper, and shape A2 of the upper corresponds to a bottom surface portion of the upper. In addition, shape A2 of the upper corresponds to the shape of the sole side of the shoe last data. A sheet-shaped member containing heat-shrinkable threads may be used as the member that forms the upper because the sheet-shaped member is easily formed so as to follow the shape of the shoe last. The data generating apparatus 100 may compute an assumed heat shrinkage coefficient of the threads contained in the sheet-shaped member, and correct the cutting data based on a result of computation. For example, the data generating apparatus 100 may correct the cutting data such that a direction in which the heat shrinkage coefficient of the threads is high is larger than the other directions. An example of the sheet-shaped member containing the heat-shrinkable threads will be described below. As a matter of course, the member that forms the upper is not limited to the sheet-shaped member described below, and may be a member made of another material or a member having another shape.

Figure 5:
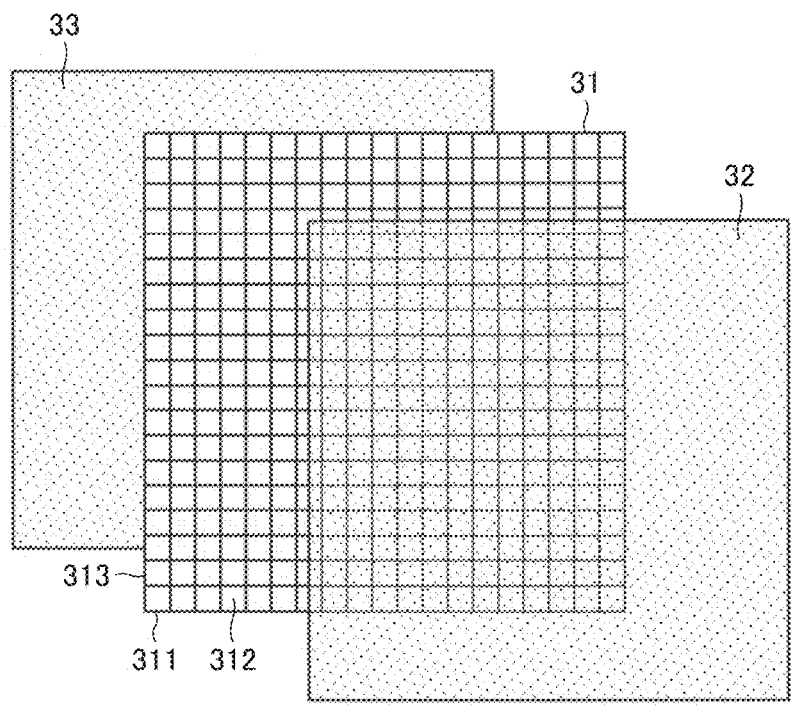
FIG. 5 is a schematic view of a sheet-shaped member containing heat-shrinkable threads.

FIG. 5 is a schematic view of the sheet-shaped member containing the heat-shrinkable threads. The sheet-shaped member shown in FIG. 5 includes a sheet-shaped first layer 31, a sheet-shaped second layer 32 stacked outside first layer 31, and a sheet-shaped third layer 33 stacked inside first layer 31. The first layer 31 contains heat-shrinkable threads 311. The first layer 31 is made of knitted fabric or woven fabric having inner gaps 312. Although a way of knitting the knitted fabric is not particularly limited, Russell knitting or tricot knitting can, for example, be used. Although a way of weaving the woven fabric is not particularly limited, plain weaving or twill weaving can, for example, be used. The sheet-shaped member is not limited to the sheet-shaped member including the first layer 31, the second layer 32 and the third layer 33.

The second layer 32 is made of nonwoven fabric. Nonwoven fabric containing polyester fibers can, for example, be used. Since the fibers of the nonwoven fabric of the second layer 32 are entangled with each other, the nonwoven fabric of the second layer 32 does not have any inner gaps corresponding to the inner gaps 312 of the first layer 31.

In the upper, the first layer 31 is arranged inside the second layer 32 (on the side close to a foot of a wearer when worn), and the third layer 33 is arranged inside the first layer 31. That is, the first layer 31 corresponds to a middle layer, the second layer 32 corresponds to an outer layer, and the third layer 33 corresponds to an inner layer. The first layer 31, the second layer 32 and the third layer 33 are integrated together by needle punching. Although the example in which the first layer 31, the second layer 32 and the third layer 33 are integrated together by needle punching has been described, needle punching is not necessarily required.

"Inner gaps" herein refer to spaces that exist between fibers such as threads that form knitted fabric or woven fabric, or between fiber aggregates. Generally, when fibers are arranged to extend in a plane direction in knitted fabric or woven fabric, "inner gaps" refer to spaces penetrating in a normal direction of the plane, or spaces divided in the plane direction. When a distance between adjacent fiber intersections is maintained, "inner gaps" refer to spaces surrounded by a plurality of fiber intersections. When fusible threads are used as described below, fiber intersections enter a fixed state and intersecting fibers (threads) are fixed, after the fibers are fused by thermoforming of the upper. "Inner gaps" correspond to, for example, mesh openings (refer to the inner gaps 312 formed by the threads 311 (wefts) and threads 313 (warps) in the woven fabric of the first layer 31 shown as the middle layer of the overlapping three layers in FIG. 5) or a cloth opening portion. In the first embodiment, a distance between adjacent fiber intersections is set at 1 to 5 mm. Alternatively, a ratio of spaces in the plane direction to the knitted fabric or the woven fabric is set at 15 to 30%. These two conditions can be set such that one of these two conditions is satisfied.

Since the first layer 31 includes the inner gaps 312, the spaces of the inner gaps 312 permit deformation (shrinkage) of the heat-shrinkable threads 311 and movement of the intersecting threads 313 (see FIG. 6B) caused by the deformation. Therefore, the spaces of the inner gaps 312 do not inhibit deformation of the first layer 31 caused by the heat-shrinkable threads 311. Therefore, the first layer 31 can be deformed as designed, and thus, setting of conditions for heat shrinkage (such as the heating temperature and the heating time) is easy.

Figure 6A:
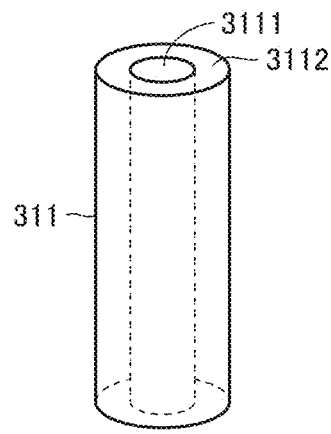
FIG. 6A is a schematic view for illustrating a first layer containing heat-shrinkable threads.
Figure 6B:
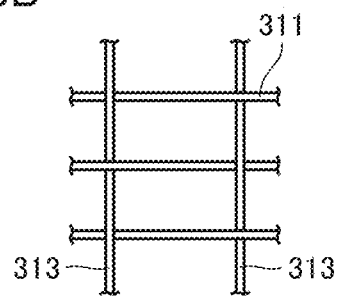
FIG. 6B is a schematic view for illustrating the first layer containing the heat-shrinkable threads.
Figure 6C:
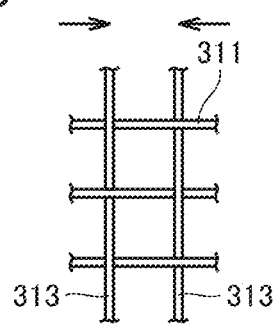
FIG. 6C is a schematic view for illustrating the first layer containing the heat-shrinkable threads.
Figure 6D:
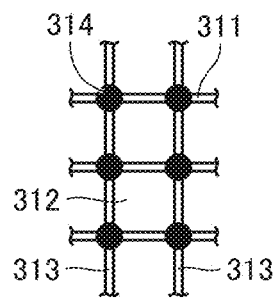
FIG. 6D is a schematic view for illustrating the first layer containing the heat-shrinkable threads.

FIGS. 6A to 6D are schematic views for illustrating the first layer 31 containing the heat-shrinkable threads 311. FIG. 6A is a perspective view schematically showing a configuration of the threads made of a core sheath material. FIG. 6B shows an initial state of the woven fabric. FIG. 6C schematically shows a state in which the wefts have shrunk. FIG. 6D schematically shows a state in which the warps and the wefts have been welded to each other.

As schematically shown in FIG. 6A, the heat-shrinkable threads 311 contained in the first layer 31 can be made of a core sheath material including a core 3111 (inner circumferential portion) and a sheath 3112 (outer circumferential portion) that are integrally formed. The threads 311 are fusible threads that are fused by heat, and a melting point of the core 3111 is different from a melting point of the sheath 3112. In the threads 311, the melting point of sheath 3112 is lower than the melting point of the core 3111. Therefore, by heating the upper before forming the upper, the threads 311 as a whole shrink and only the sheaths 3112 are melted. Thus, the shape-retaining function by the sheaths 3112 and the elastic function by the cores 3111 are compatible with each other. A sheath core material made of threads containing polyester resin, and more specifically a sheath core material made of polyester-based thermoplastic elastomer, a sheath core material including the core 3111 made of polyester-based thermoplastic elastomer and the sheath 3112 made of polyamide-based thermoplastic elastomer, or the like can, for example, be used as the heat-shrinkable threads 311.

The first layer 31 can also be made of woven fabric in which one of warps and wefts are the heat-shrinkable threads 311, or knitted fabric in which the heat-shrinkable threads 311 account for 10% or more. When the first layer 31 is made of the woven fabric, the heat-shrinkable threads 311 (the warps or the wefts) are arranged along a width direction of the upper. It is (technically) common to use the heat-shrinkable threads 311 as wefts. Therefore, FIG. 6B shows a configuration of the woven fabric of the first layer 31 when the heat-shrinkable threads 311 are used as wefts. According to this configuration, when the first layer 31 is heated, the threads 311 (wefts) shrink in a length direction as shown in FIG. 6C (the shrinkage in the direction shown by an arrow causes a small change in spacing between the adjacent threads 313 (warps)). Then, the sheaths 3112 of the threads 311 made of the core sheath material are melted and fixed to the threads 313 (warps) (fixed portions 314 indicated by a black circle in FIG. 6D). The first layer 31 is deformed in this way. Since the deformation is used to form the upper into a desired shape, the upper can be appropriately formed so as to follow the shape of the shoe last.

As described above, the data generating apparatus 100 according to the first embodiment generates shoe last data for manufacturing a shoe from measured foot shape data. The data generating apparatus 100 includes: the input unit 106 that receives the foot shape data; the processor 102 (computing unit) that computes the shoe last data from the foot shape data received by the input unit 106; and the output unit 108 that outputs the shoe last data computed by the processor 102. The processor 102 further computes processing data for processing a member that forms an upper of the shoe, based on the computed shoe last data. The output unit 108 further outputs the processing data computed by the processor 102. The shoe manufacturing system 10 includes: the measuring apparatus 200 that measures a foot shape and outputs the foot shape data to the data generating apparatus 100; the data generating apparatus 100 described above; the shoe last producing apparatus 400 that produces a shoe last based on the shoe last data generated by the data generating apparatus 100; and the processing apparatus 600 that processes the member that forms the upper, based on the processing data generated by the data generating apparatus 100.

Thus, the data generating apparatus 100 according to the first embodiment computes the processing data adapted to the processing apparatus 600 that processes the member that forms the upper of the shoe. Therefore, a material of the shoe last and a method for producing the shoe last are not limited, and the time required to manufacture the shoe can be shortened. In addition, the shoe manufacturing system 10 produces the shoe last from the shoe last data generated by the data generating apparatus 100, and processes the member that forms the upper, based on the processing data. Therefore, the member that forms the upper can be processed without waiting until the shoe last is produced, and thus, the time required to manufacture the shoe can be shortened.

The shoe last data preferably includes at least one of upper data (first data) corresponding to an upper-side region of the shoe and sole data (second data) corresponding to a sole-side region of the shoe. For example, when shoes including soles of the same shape are manufactured, the sole data can be shared. In addition, the processor 102 preferably computes the processing data based on the upper data. Thus, the data used to compute the processing data can be limited to the upper data.

The member that forms the upper preferably includes one or more sheet-shaped members, and the processing data is preferably the cutting data for cutting at least one of the sheet-shaped members. Particularly, the member that forms the upper preferably includes the sheet-shaped members containing heat-shrinkable threads, and the processor 102 preferably computes an assumed heat shrinkage coefficient of the threads contained in the sheet-shaped members, and corrects the cutting data based on a result of computation. Thus, the data generating apparatus 100 can generate the cutting data for appropriately cutting the shape of the upper from the sheet-shaped members so as to follow the shape of the shoe last.

Second Embodiment

In the data generating apparatus 100 according to the first embodiment, the description has been given of the example in which the processing data for processing the member that forms the upper of the shoe is computed based on the shoe last data. In a data generating apparatus 100 according to a second embodiment, not only the processing data but also a heating condition when the sheet-shaped member is processed is computed. Since a shoe manufacturing system and a data generating apparatus according to the second embodiment have the same configurations as those of the shoe manufacturing system 10 and the data generating apparatus 100 according to the first embodiment, the shoe manufacturing system and the data generating apparatus according to the second embodiment are given the same reference characters and detailed description will not be repeated.

Figure 7:
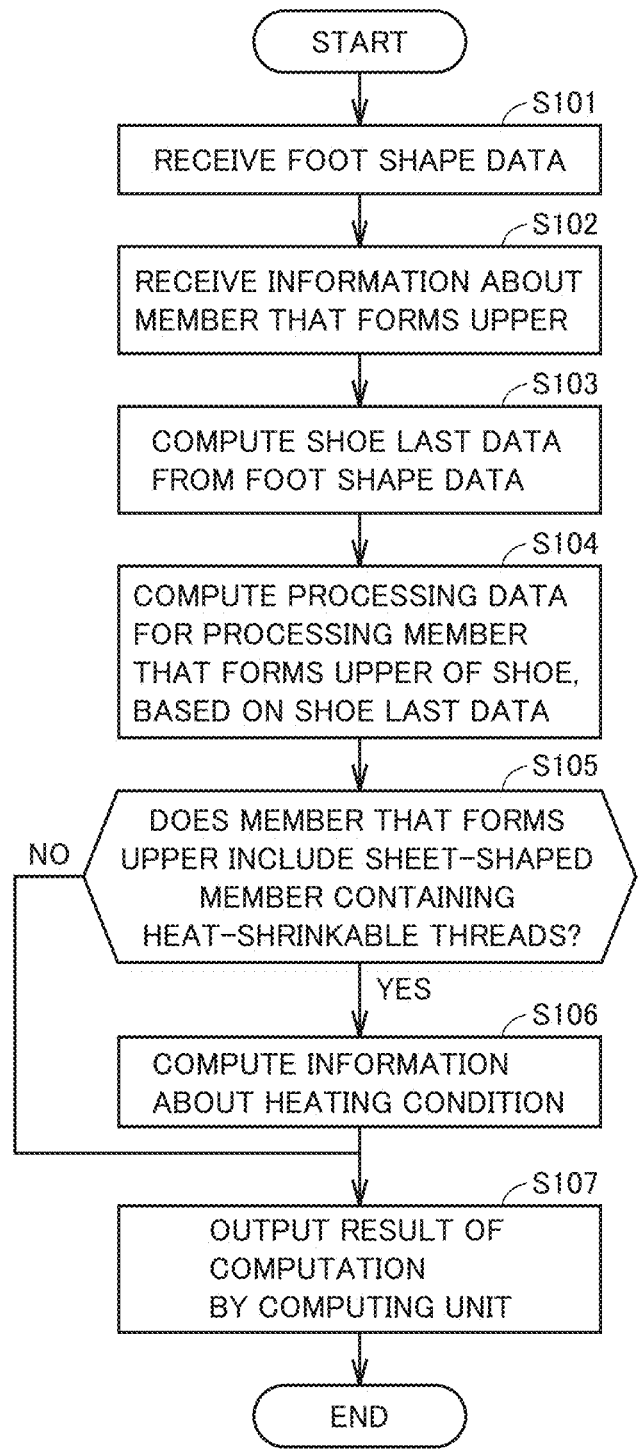
FIG. 7 is a flowchart for illustrating a way in which a data generating apparatus according to a second embodiment generates shoe last data from foot shape data.

The following is a description of an example in which when a sheet-shaped member contains heat-shrinkable threads, the data generating apparatus 100 computes a heating condition when the cut sheet-shaped member is heated and formed so as to follow a shoe last, in addition to cutting data (processing data) for cutting the sheet-shaped member. FIG. 7 is a flowchart for illustrating a way in which the data generating apparatus according to the second embodiment generates shoe last data from foot shape data. First, the data generating apparatus 100 receives foot shape data measured by the measuring apparatus 200 or the mobile terminal 300 (step S101).

The data generating apparatus 100 receives information about a member that forms an upper (step S102). Specifically, when the member that forms the upper includes a sheet-shaped member containing heat-shrinkable threads as shown in FIG. 5, the data generating apparatus 100 receives information such as a shape of the sheet, a material of the sheet, and a heat shrinkage coefficient of the used threads. Specifically, based on information about the member that forms the upper, which is selected by the user through the input unit 106, information corresponding to this member is read from the database prestored in the storage 110 or the data server 500. FIG. 8 illustrates an example of the database that stores the information about the member that forms the upper.

In FIG. 8, information about a member A, a member B, a member C and the like is stored in the database as the member that forms the upper. The member A is a member that forms the upper from one sheet including three integrated layers as shown in FIG. 5. Therefore, as for the member A, "sheet (three layers)" is stored in the database as the shape information, "having layer containing heat-shrinkable threads" is stored in the database as the material information, and "heat shrinkage coefficient" is stored in the database as the other information. The member B is a member that forms the upper from three sheets. Therefore, as for the member B, information about a sheet B1, information about a sheet B2, and information about a sheet B3 are stored in the database. As for the sheet B1, "sheet (B1)" is stored as the shape information, and "cloth" is stored as the material information. As for the sheet B2, "sheet (B2)" is stored as the shape information, and "resin" is stored as the material information. As for the sheet B3, "sheet (B3)" is stored as the shape information, "containing heat-shrinkable threads" is stored as the material information, and "heat shrinkage coefficient" is stored as the other information. The member C is a member that forms the upper by processing the member using the 3D printer. Therefore, as for the member C, "processed using 3D printer" is stored in the database as the shape information, "thermoplastic resin" is stored in the database as the material information, and "setting condition of 3D printer" is stored in the database as the other information.

Referring again to FIG. 7, the data generating apparatus 100 computes shoe last data from the foot shape data (step S103). The data generating apparatus 100 computes processing data for processing the member that forms the upper of the shoe, based on the shoe last data computed in step S103 (step S104). The data generating apparatus 100 computes different types of processing data, depending on the information about the member that forms the upper, which has been received in step S102. Specifically, when the member that forms the upper is the member A, the data generating apparatus 100 computes cutting data for cutting the shape of the upper from the one sheet. Since the member A has a layer containing heat-shrinkable threads, the data generating apparatus 100 computes an assumed heat shrinkage coefficient of the threads contained in the sheet-shaped member, and corrects the cutting data based on a result of computation.

When the member that forms the upper is the member B, the data generating apparatus 100 computes cutting data for cutting the shape of the upper for each of the three sheets. Since the sheet B3 contains heat-shrinkable threads, the data generating apparatus 100 computes an assumed heat shrinkage coefficient of the threads contained in the sheet-shaped member, and corrects the cutting data for the sheet B3 based on a result of computation. Furthermore, when the member that forms the upper is the member C, the data generating apparatus 100 computes processing data for processing the shape of the upper using the 3D printer.

Referring again to FIG. 7, the data generating apparatus 100 determines whether or not the member that forms the upper includes a sheet-shaped member containing heat-shrinkable threads (step S105). When the member that forms the upper includes a sheet-shaped member containing heat-shrinkable threads (YES in step S105), the data generating apparatus 100 computes information about a heating condition, based on the information about the member that forms the upper, which has been received in step S102, and the processing data computed in step S104. Specifically, information such as the material and the heat shrinkage coefficient of the heat-shrinkable threads is obtained from the information about the member that forms the upper, and information such as the size of the upper is obtained from the processing data. Based on these pieces of information, the data generating apparatus 100 computes the heating condition such as the heating temperature and the heating time when the member that forms the upper is steam-heated and formed so as to follow the shoe last. For example, the data generating apparatus 100 sets the heating time longer when the size of the upper is large, and sets the heating temperature higher when the threads have a high heat fusion temperature.

When the data generating apparatus 100 computes the processing data for processing the shape of the upper using the 3D printer, the data generating apparatus 100 may compute a setting condition of the 3D printer based on the information about the member that forms the upper. Specifically, the data generating apparatus 100 computes an optimum setting condition in consideration of the information such as the size of the upper obtained from the processing data, based on the setting condition of the 3D printer obtained from the information about the member that forms the upper.

After step S106, or when the member that forms the upper does not include a sheet-shaped member containing heat-shrinkable threads (NO in step S105), the data generating apparatus 100 outputs a result of computation (such as the shoe last data, the processing data and the heating condition) from the output unit 108 (step S107). The shoe last data output from the data generating apparatus 100 is received by the shoe last producing apparatus 400. The shoe last producing apparatus 400 produces a shoe last based on the received shoe last data. The processing data output from the data generating apparatus 100 is received by the processing apparatus 600. The processing apparatus 600 processes the member that forms the upper, based on the received processing data. When the processing data is cutting data, the processing apparatus 600 cuts the shape of the upper from the sheet-shaped member based on the cutting data. The heating condition output from the data generating apparatus 100 is received by a heating apparatus (not shown). The heating apparatus can heat the member that forms the upper, based on the received heating condition, and form the upper so as to follow the shape of the shoe last.

As described above, in the data generating apparatus 100 according to the second embodiment, the processor 102 computes the information about the heating condition when the sheet-shaped member cut based on the cutting data is processed, and the output unit 108 further outputs the information about the heating condition computed by the processor 102. Thus, the upper can be appropriately formed so as to follow the shape of the shoe last.

The input unit 106 preferably further receives the information about the member that forms the upper, and the processor 102 preferably corrects the processing data based on the received information about the member that forms the upper. For example, when the member that forms the upper is member B, the processor 102 computes an assumed heat shrinkage coefficient of the heat-shrinkable threads contained in the sheet B3, and corrects the cutting data (processing data) based on a result of computation. However, the processor 102 does not correct the cutting data (processing data) for the other sheets B1 and B2. Thus, the data generating apparatus 100 can generate the processing data for appropriately processing the shape of the upper so as to follow the shape of the shoe last. Furthermore, when the member that forms the upper includes a plurality of sheet-shaped members, the processor 102 preferably computes the cutting data for each of the sheet-shaped members. For example, when the member that forms the upper is member B, the data generating apparatus 100 computes the cutting data for each of sheets B1 to B3. Thus, the data generating apparatus 100 can generate the optimum cutting data for each of sheets B1 to B3.

<Other Modifications>

Figure 9:
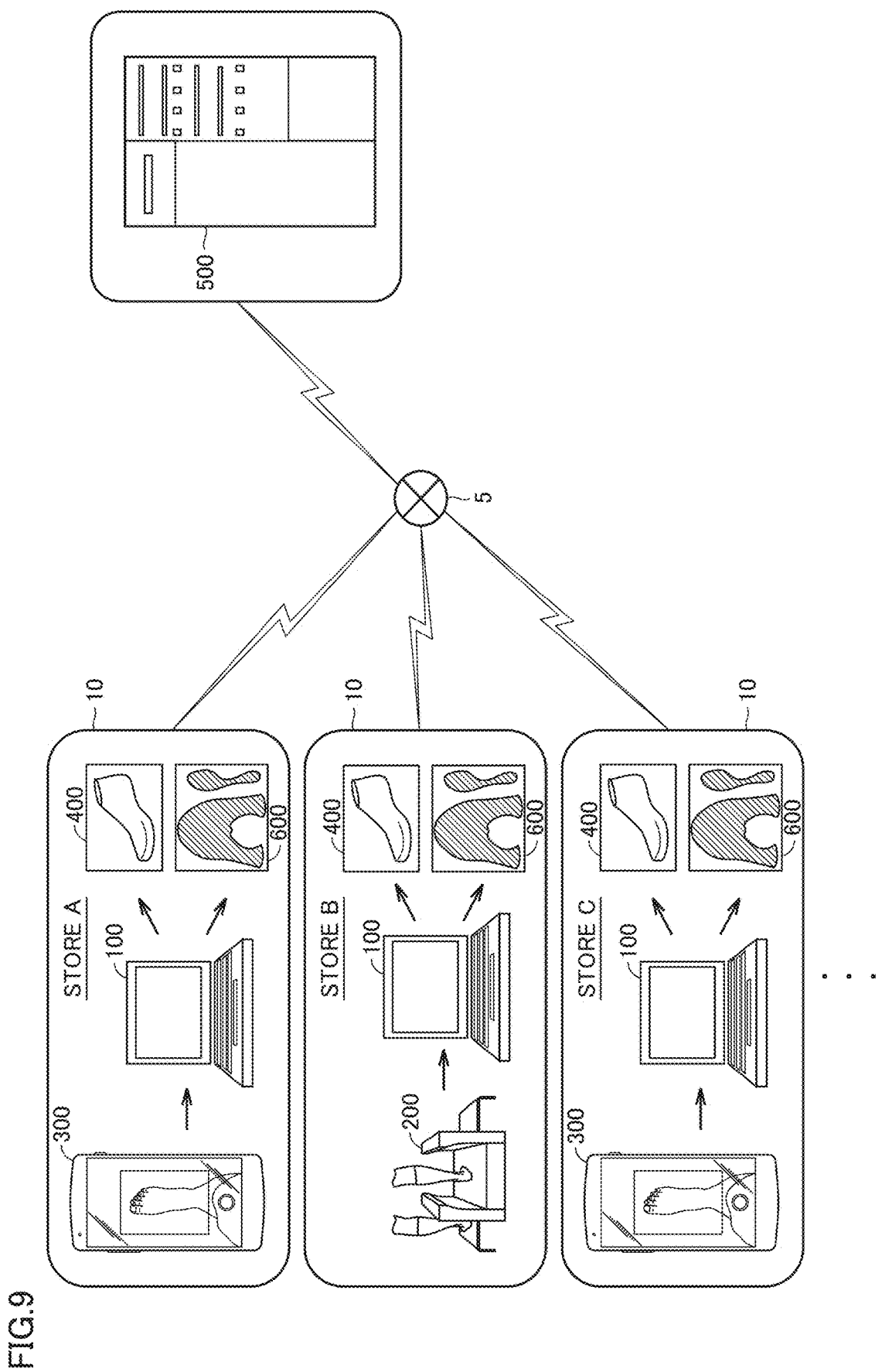
FIG. 9 is a schematic view showing a state in which shoe manufacturing systems at various stores are connected to a data server 500.

The shoe manufacturing system 10 at one store including the data generating apparatus 100, the measuring apparatus 200, the shoe last producing apparatus 400, and the processing apparatus 600 has been described with reference to FIG. 1. However, the shoe manufacturing system 10 may include a store where the measuring apparatus 200 is not provided and a foot shape is measured using the mobile terminal 300 such as a smartphone. The shoe manufacturing system 10 may include a store where the shoe last producing apparatus 400 and the processing apparatus 600 are not provided and a shoe last is produced using the shoe last producing apparatus 400 placed at another store and an upper is produced using the processing apparatus 600 to manufacture a shoe. FIG. 9 is a schematic view showing a state in which the shoe manufacturing systems at various stores are connected to the data server 500.

As shown in FIG. 9, the shoe manufacturing system 10 is arranged in each of a plurality of stores A to C. For example, store A and store C are small stores in a city. Inside store A and store C, a salesclerk captures an image of a foot of a user using the mobile terminal 300 to thereby obtain foot shape data using the mobile terminal 300, or store A and store C receive foot shape data measured at home or the like by the user himself/herself using the mobile terminal 300. In contrast, store B is a large store in a shopping mall or the like. Inside store B, a salesclerk measures a foot of a user using the measuring apparatus 200 to thereby obtain foot shape data. The foot shape data obtained in each of stores A to C is processed by the data generating apparatus 100 of each store, and may be stored in the data server 500 arranged in a manufacturer or the like through a network 5, together with user's personal information.

The manufacturer generates shoe last data and sole data of existing shoes and stores the shoe last data and the sole data in a shoe last database and a sole database in the data server 500. Since the shoe last data and the sole data of the existing shoes are stored in the shoe last database and the sole database in the data server 500, the data generating apparatus 100 provided at each store can select shoe last data close to the foot shape data from a library of the shoe last database, and select sole data selected by the user from a library of the sole database. In addition, based on information about a shoe used by the user, the data generating apparatus 100 can search for shoe last data and sole data of the shoe from the shoe last database and the sole database in the data server 500. The information stored in the data server 500 is not limited to the shoe last data and the sole data of the existing shoes, and the data server 500 may store running data of the user, shoe last data previously generated by the user, information about a sport in which the shoe is used, information about a material of an upper, and the like.

Instead of being arranged in the manufacturer different from the stores, the data server 500 may be arranged at another location or in a certain store. For example, the data server 500 may be arranged in any one of stores A to C. A plurality of shoe manufacturing systems 10 may be arranged in one store, or a local data server that can communicate with the plurality of shoe manufacturing systems 10 may be arranged in the one store. The data server 500 may be implemented in the form of a cloud service. Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A data generating apparatus that generates shoe last data for manufacturing a shoe from measured foot shape data, the data generating apparatus comprising:
    an input unit that receives the foot shape data from a three-dimensional scanner or a mobile terminal;
    a computing unit that computes the shoe last data from the foot shape data received by the input unit; and
    an output unit that outputs the shoe last data computed by the computing unit, wherein
    the computing unit further computes processing data for directly processing a member that forms an upper of the shoe from the computed shoe last data,
    the output unit further outputs the processing data computed by the computing unit to cause a processing apparatus to process the member to form the upper of the shoe,
    the input unit further receives information about the member that forms the upper,
    the computing unit directly corrects the processing data from the received information about the member that forms the upper, the member that forms the upper includes one or more sheet-shaped members, and the processing data is cutting data for cutting at least one of the sheet-shaped members.

2. The data generating apparatus according to claim 1, wherein
the shoe last data includes first data corresponding to an upper-side region of the shoe and second data corresponding to a sole-side region of the shoe.

3. The data generating apparatus according to claim 2, wherein
the computing unit computes the processing data based on the first data.

4. The data generating apparatus according to claim 1, wherein
when the member that forms the upper includes a plurality of the sheet-shaped members, the computing unit computes the cutting data for each of the sheet-shaped members.

5. The data generating apparatus according to claim 4, wherein
the member that forms the upper includes the sheet-shaped members containing heat-shrinkable threads, and
the computing unit computes an assumed heat shrinkage coefficient of the threads contained in the sheet-shaped members, and corrects the cutting data based on a result of computation.

6. The data generating apparatus according to claim 5, wherein
the computing unit computes information about a heating condition when the sheet-shaped members cut based on the cutting data are processed, and
the output unit further outputs the information about the heating condition computed by the computing unit.

7. A shoe manufacturing system comprising:
a measuring apparatus that measures foot shape data using a three-dimensional scanner or a mobile phone;
a data generating apparatus that generates shoe last data for manufacturing a shoe based on the foot shape data measured by the measuring apparatus;
a shoe last producing apparatus that produces a shoe last based on the shoe last data generated by the data generating apparatus; and
a processing apparatus that processes a member that forms an upper, based on processing data generated by the data generating apparatus, wherein the data generating apparatus includes:
an input unit that receives the foot shape data;
a computing unit that computes the shoe last data from the foot shape data received by the input unit; and
an output unit that outputs the shoe last data computed by the computing unit to the shoe last producing apparatus, wherein
the computing unit further computes the processing data for directly processing the member that forms the upper of the shoe from the computed shoe last data,
the output unit outputs the processing data computed by the computing unit to cause the processing apparatus to process the member to form the upper of the shoe
the input unit further receives information about the member that forms the upper,
the computing unit directly corrects the processing data from the received information about the member that forms the upper,
the member that forms the upper includes one or more sheet-shaped members, and
the processing data is cutting data for cutting at least one of the sheet-shaped members.

8. A data generating method for generating shoe last data for manufacturing a shoe from measured foot shape data, the data generating method comprising:
receiving the foot shape data from a three-dimensional scanner or a mobile terminal;
receiving information about a member that forms an upper;
computing the shoe last data from the received foot shape data;
computing processing data for directly processing the member that forms the upper of the shoe from the computed shoe last data;
directly correcting the processing data from the received information about the member that forms the upper; and
outputting the computed shoe last data and the computed processing data to cause a processing apparatus to process the member to form the upper of the shoe, wherein
the member that forms the upper includes one or more sheet-shaped members, and
the processing data is cutting data for cutting at least one of the sheet-shaped members.

* * * * *